US012612162B2

(12) United States Patent
Thomas et al.

(10) Patent No.: US 12,612,162 B2
(45) Date of Patent: Apr. 28, 2026

(54) PASSENGER SEAT UNIT WITH MULTI-TRACK SLIDING DOOR

(71) Applicant: Safran Seats GB Limited, Cwmbran (GB)

(72) Inventors: Darren Thomas, Cwmbran (GB); Christian Cosway, Cwmbran (GB); Kerry Morgan, Cwmbran (GB); Tracey Roberts, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 392 days.

(21) Appl. No.: 17/762,312

(22) PCT Filed: Oct. 29, 2020

(86) PCT No.: PCT/IB2020/060160
§ 371 (c)(1),
(2) Date: Mar. 21, 2022

(87) PCT Pub. No.: WO2021/084470
PCT Pub. Date: May 6, 2021

(65) Prior Publication Data
US 2022/0332423 A1     Oct. 20, 2022

Related U.S. Application Data

(60) Provisional application No. 62/927,423, filed on Oct. 29, 2019.

(51) Int. Cl.
| | |
|---|---|
| *B64D 11/06* | (2006.01) |
| *B64D 11/00* | (2006.01) |
| *E06B 3/46* | (2006.01) |

(52) U.S. Cl.
CPC ...... *B64D 11/0606* (2014.12); *B64D 11/0023* (2013.01); *E06B 3/46* (2013.01)

(58) Field of Classification Search
CPC .... B64D 11/0606; B64D 11/0023; E06B 3/46
(Continued)

(56) References Cited

U.S. PATENT DOCUMENTS

| | | | | | |
|---|---|---|---|---|---|
| 3,374,823 | A | * | 3/1968 | 031968 ..................... | H02G 5/04 160/331 |
| 3,457,677 | A | * | 7/1969 | Ziegler ............... | E05D 15/0647 16/93 R |

(Continued)

FOREIGN PATENT DOCUMENTS

| | | |
|---|---|---|
| CN | 102227335 A | 10/2011 |
| EP | 2894285 A1 | 7/2015 |

(Continued)

OTHER PUBLICATIONS

International Patent Application No. PCT/IB2020/060160, International Search Report and Written Opinion, dated Feb. 2, 2021.
(Continued)

*Primary Examiner* — Gregory J Strimbu
(74) *Attorney, Agent, or Firm* — Kilpatrick Townsend & Stockton LLP

(57) ABSTRACT

An aircraft door assembly may comprise a stationary portion comprising at least one translation track and a movable portion comprising at least one channel. The movable portion is slidably coupled to the stationary portion via at least an attachment plate. The aircraft door assembly comprises a locked state and an unlocked state. In the locked state, the attachment plate and the movable portion are slidable as a unit relative to the stationary portion along the at least one translation track. In the unlocked state, the movable portion is slidable relative to the attachment plate and the stationary portion along the at least one channel.

14 Claims, 4 Drawing Sheets

(58) Field of Classification Search

USPC ......................................................... 16/96 R

See application file for complete search history.

(56) References Cited

U.S. PATENT DOCUMENTS

| | | | | |
|---|---|---|---|---|
| 7,117,559 | B1 | 10/2006 | Barber | |
| 7,653,966 | B2 * | 2/2010 | Quinn | E05D 15/0647 |
| | | | | 16/93 R |
| 8,393,055 | B2 * | 3/2013 | Gower | E04H 9/14 |
| | | | | 16/95 D |
| 11,708,162 | B2 * | 7/2023 | Ivanov | B64D 11/0602 |
| | | | | 244/118.6 |
| 2013/0240163 | A1 * | 9/2013 | Mosler | B64D 11/00 |
| | | | | 160/368.1 |
| 2018/0066706 | A1 * | 3/2018 | Yen | F16C 33/205 |
| 2019/0210733 | A1 * | 7/2019 | Herault | B64D 11/0604 |
| 2019/0359338 | A1 * | 11/2019 | Colletti | B64D 11/0606 |
| 2020/0122838 | A1 * | 4/2020 | Bonnefoy | B64D 11/0606 |
| 2021/0179254 | A1 * | 6/2021 | Scotford | E05D 15/0652 |
| 2022/0402609 | A1 * | 12/2022 | Warwick | E05D 15/0682 |
| 2022/0402612 | A1 * | 12/2022 | Davis | B64D 11/0602 |
| 2023/0012146 | A1 * | 1/2023 | Sprague | E05D 15/0647 |
| 2023/0287720 | A1 * | 9/2023 | Hoang | E05D 15/0652 |

FOREIGN PATENT DOCUMENTS

| | | | |
|---|---|---|---|
| JP | 2015511557 | A | 4/2015 |
| TW | 201641057 | A | 12/2016 |
| WO | 2018184778 | A1 | 10/2018 |
| WO | WO 2021/064014 | * | 4/2021 |

OTHER PUBLICATIONS

Europe Appl. No. 20803933.9, Office Action, Jan. 4, 2024, 4 pages.

Chinese Office Action 202080075148.5, Office Action mailed on May 15, 2024, 9 pages (7 pages of Original Document and 2 pages of English Translation).

Chinese Application No. 202080075148.5, Office Action mailed on Dec. 6, 2024, 10 pages (8 pages of original document and 2 pages of English Translation).

European Application No. 20803933.9, Office Action mailed on Feb. 5, 2025, 4 pages.

Chinese Application No. 202080075148.5, Office Action mailed on May 23, 2025, 8 pages (6 pages of Original Document and 2 pages of English Translation).

* cited by examiner

PASSENGER SEAT UNIT WITH MULTI-TRACK SLIDING DOOR

CROSS REFERENCE TO RELATED APPLICATION

This application claims the benefit of U.S. Provisional Application No. 62/927,423, filed on Oct. 29, 2019, and entitled "DISENGAGE ONE PIECE DOOR FROM PRIMARY RAIL SYSTEM," the content of which is hereby incorporated by reference in its entirety.

FIELD OF THE INVENTION

The field of the invention relates to passenger seat units, such as mini suites, having a passenger seat area, and more particularly to privacy screens, walls, or doors that divide the passenger seat area from an aisle area or other common area.

BACKGROUND

Many vehicles such as passenger aircraft, buses, trains, ships, automobiles, and the like include seats that passengers may use during travel. Some vehicles include seats that are provided with passenger seat units, such as mini suites, having privacy shells or screens that enable a passenger occupying the seat to have an enclosed feeling. For example, a privacy screen, wall, or sliding door may be provided that divides a passenger seat area that includes the passenger seat from the aisle area or other common area. To fully close off the passenger seat area, some passenger seat units may include privacy doors or screens (collectively a "privacy feature"), and airline crew and/or other passengers cannot see in to the suite and/or cannot access the suite without moving a door.

While passenger comfort and privacy are important considerations in passenger seat unit design, passenger seat units are also subject to safety requirements established by governments or other standard-setting organizations. For example, some regulations require that no door may be installed or deployed between any passenger and any emergency exit space or aisle during certain situations such as taxiing, takeoff, and landing (TTL). Other regulations may require that the door must be openable even if an adjacent aisle is crowded or if an element of the door fails. Accordingly, any privacy feature that may be associated with the passenger seat must allow a safe and timely exit from the passenger seat unit.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aircraft door assembly comprises: a stationary portion comprising at least one translation track; and a movable portion comprising at least one channel, wherein the movable portion is slidably coupled to the stationary portion via at least an attachment plate; wherein the aircraft door assembly comprises a locked state and an unlocked state; wherein in the locked state, the attachment plate and the movable portion are slidable as a unit relative to the stationary portion along the at least one translation track; and wherein in the unlocked state, the movable portion is slidable relative to the attachment plate and the stationary portion along the at least one channel.

In some embodiments, the aircraft door assembly further comprises an actuator coupled to at least one of the stationary portion or the movable portion, wherein the actuator is activable to change the aircraft door assembly from the locked state to the unlocked state.

In certain embodiments, the attachment plate comprises at least one first protrusion and at least one second protrusion.

The at least one first protrusion may be engageable with the at least one translation track and the at least one second protrusion may be engageable with the at least one channel.

The at least one second protrusion, in some embodiments, is movable along the at least one channel when the aircraft door assembly is in the unlocked state.

At least one of the at least one first protrusion and the at least one second protrusion, in certain embodiments, is T-shaped.

In the unlocked state, the attachment plate may maintain a substantially stationary position.

According to certain embodiments of the present invention, a passenger vehicle comprising a door assembly (which may incorporate features of any of the preceding or subsequent examples), the door assembly comprising: a stationary wall portion comprising at least one translation track; and a door portion comprising at least one channel, wherein the door portion is slidably coupled to the stationary wall portion via at least a carriage member; and an actuator, wherein the door portion is slidable relative to the carriage member and the stationary wall portion along the at least one channel upon the activation of the actuator.

In some embodiments, the at least one translation track comprises a rail assembly.

In certain embodiments, the carriage member comprises at least one first protrusion and at least one second protrusion.

The at least one first protrusion may be engageable with the at least one translation track and the at least one second protrusion may be engageable with the at least one channel.

The door portion, in some embodiments, is slidable relative to the carriage member via the at least one second protrusion being movable along the at least one channel.

At least one of the at least one first protrusion and the at least one second protrusion, in certain embodiments, is T-shaped.

The carriage member may maintain a substantially stationary position.

According to certain embodiments of the present invention, a method (which may incorporate features of any of the preceding or subsequent examples) of using an aircraft door assembly comprising a stationary portion and a movable portion slidably coupled to the stationary portion via at least a carriage member, the method comprising: changing a lock state of the aircraft door assembly to an unlocked state, wherein in the unlocked state the movable portion is slidable relative to the carriage member and the stationary portion along at least one channel of the movable portion; and sliding the movable portion relative to the carriage member.

In some embodiments, changing the lock state of the carriage member comprises activating an actuator coupled to at least one of the stationary portion or the movable portion.

In certain embodiments, sliding the movable portion relative to the carriage member comprises sliding at least a portion of the carriage member along the at least one channel.

The carriage member may comprise at least one first protrusion and at least one second protrusion.

The method, in some embodiments, further comprises changing the lock state of the aircraft door assembly to a locked state, wherein in the locked state the movable portion and the carriage member are slidable as a unit relative to the stationary portion along at least one translation track, wherein the stationary portion comprises the at least one translation track.

The carriage member, in some embodiments, remains substantially stationary as the movable portion is slid relative to the carriage member.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing. Reference herein to a "forward-most" position or component and an "aft-most" position or component likewise merely refers to the orientation as illustrated and is not meant to require a particular orientation of components, and an "aft-most" position or component illustrated may be a "forward-most" position or component if oriented in such a manner.

The described embodiments of the invention provide passenger seat units with door assemblies. While the passenger seat units are discussed for use with aircraft and/or aircraft seats, they are by no means so limited. Rather, embodiments of the passenger seat units may be used in other vehicles and/or with seats of any type or otherwise as desired. Additionally, similar door assemblies may be used in other enclosed areas of the vehicle, e.g., the lavatory.

Figure 1A:
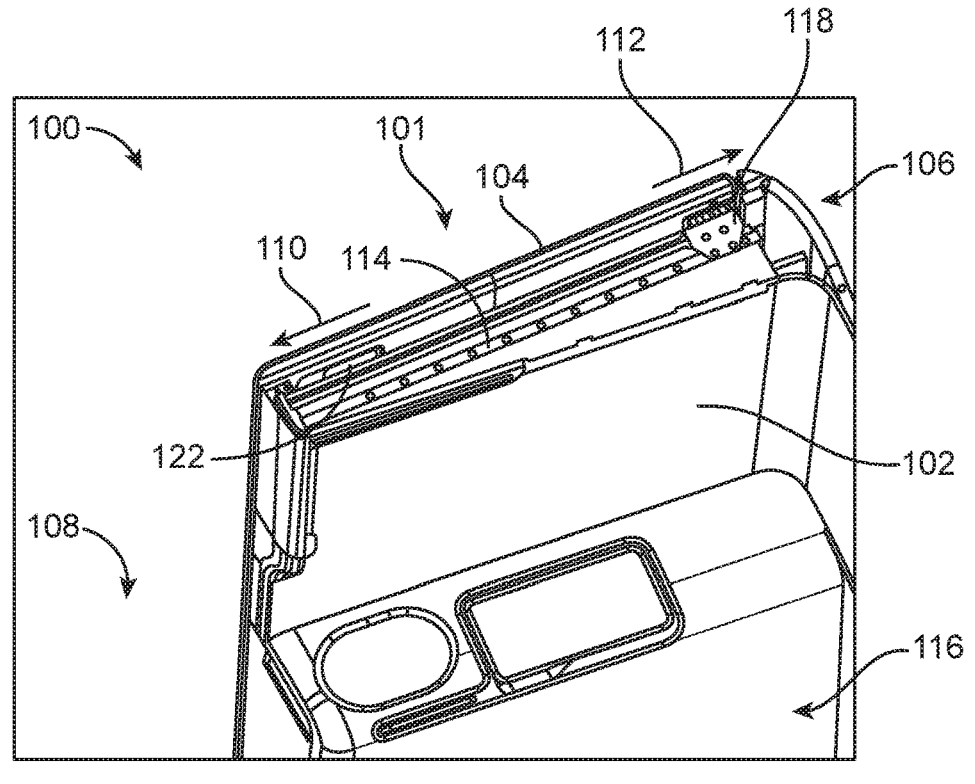
FIG. 1A is a partial perspective view of a passenger seat unit with a door assembly, according to certain embodiments of the present invention where the door is in an aft-most position.
Figure 1B:
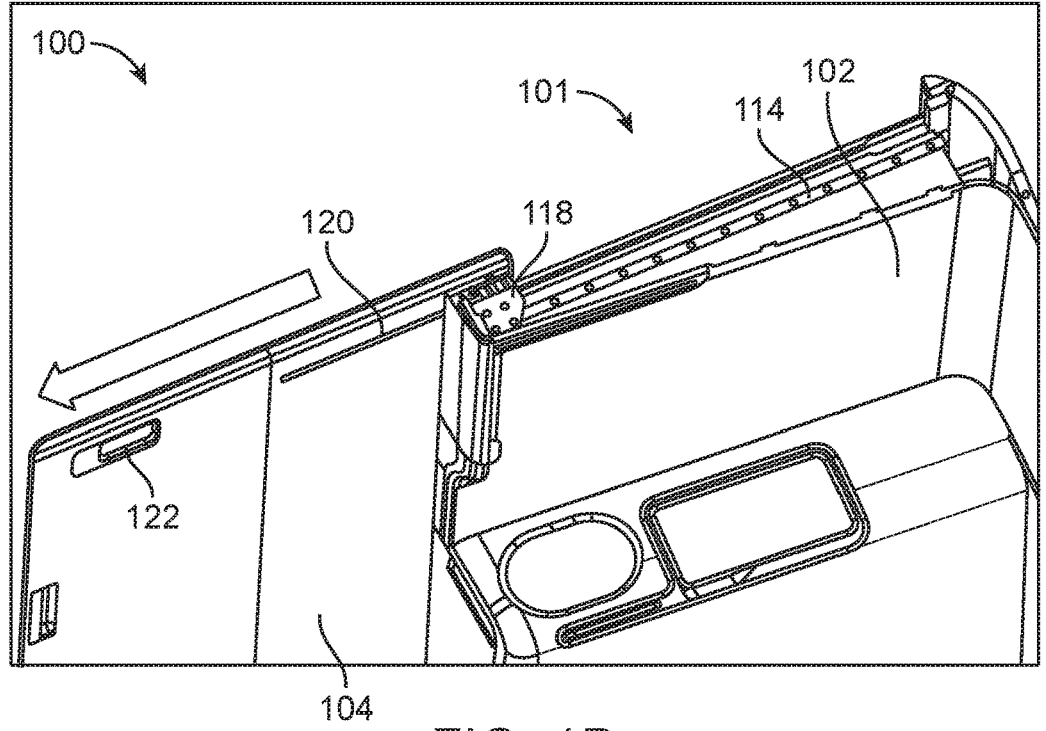
FIG. 1B is a partial perspective view of the passenger seat unit with the door assembly of FIG. 1 where the door is in a forward-most position.
Figure 1C:
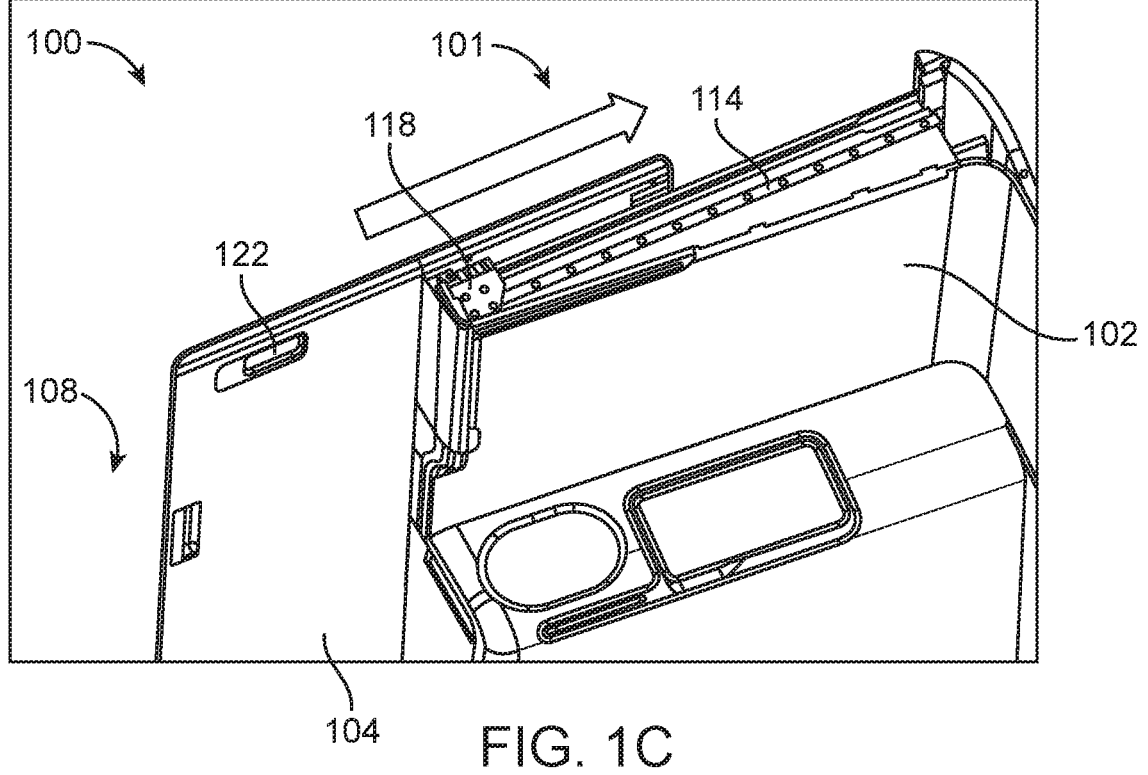
FIG. 1C is a partial perspective view of the passenger seat unit with the door assembly of FIG. 1 where the door assembly is in an unlocked state and the door is in an intermediate position.
Figure 2A:
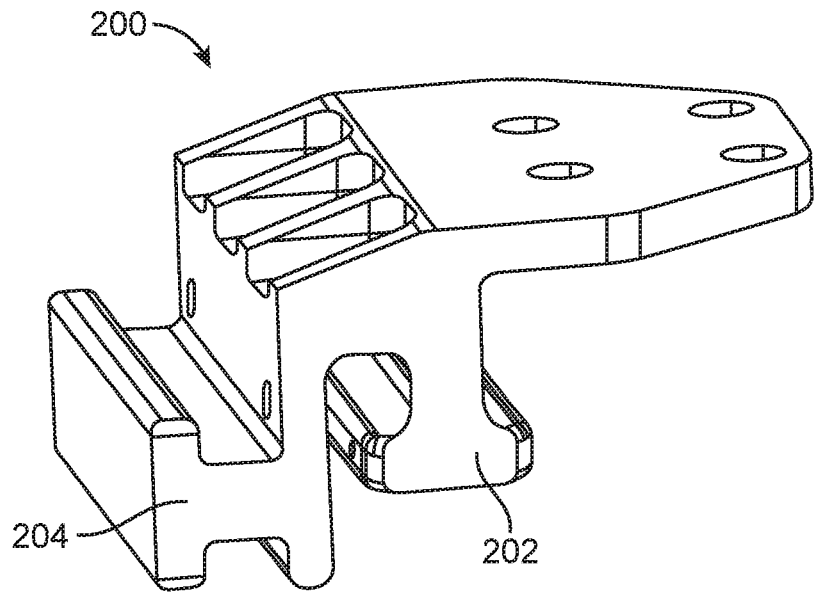
FIG. 2A is a perspective view of a carriage member of a door assembly, according to certain embodiments of the present invention.
Figure 2B:
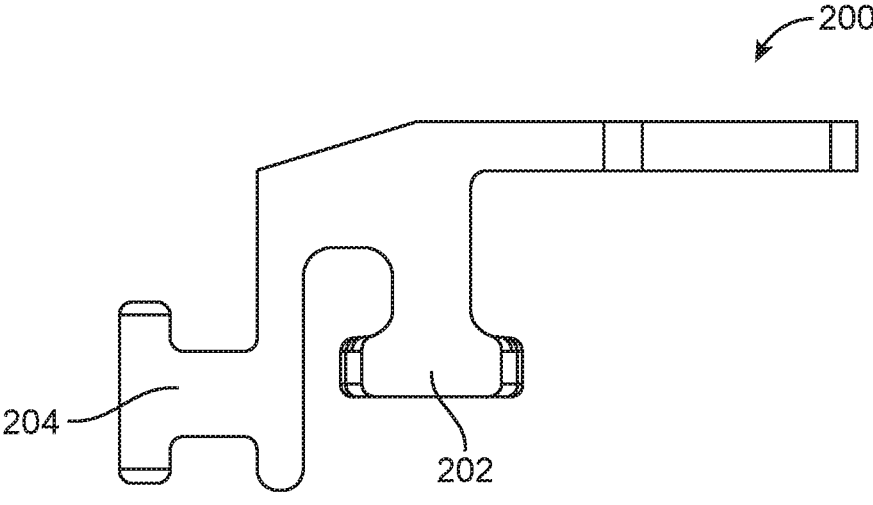
FIG. 2B is a front view of the carriage member of FIG. 2A.

According to certain embodiments of the invention, as shown in FIGS. 1A-1C, a passenger seat unit 100 may include a privacy shell 106 and a door assembly 101 that includes a wall portion 102 and a door 104. The wall portion 102 may be part of the privacy shell 106 that defines a passenger seat area 116 of the passenger seat unit 100. As best illustrated in FIGS. 1A-1C, the wall portion 102 includes an opening 108 that allows for entry to and exit from the passenger seat area 116. The particular shape of the opening 108 should not be considered limiting on the disclosure. Various passenger features may be provided in the passenger seat area 116 as desired, including but not limited to a passenger seat, a bed, a tray table, an in-flight entertainment screen, stowage compartments, closets, reading lights, various other features that may be utilized by the passenger, and/or various other combinations or sub-combination of features as desired. The shape of the wall portion 102, the door 104, the privacy shell 106, and the passenger features included in the passenger seat area 116 should not be considered limiting on the disclosure.

The door 104 of the door assembly 101 is at least partially supported on the wall portion 102 and is movable relative to the stationary wall portion 102. For example, the door 104 is movable in a forward direction, as represented by arrow 110, and an aft direction, as represented by arrow 112 (see FIG. 1). However, the forward and aft directions are merely mentioned here to provide a directional reference and the forward and aft directions may be reversed such that the forward direction may be represented by arrow 112 and the aft direction may be represented by arrow 112.

Optionally, the door 104 may include gripping features that the passenger, crew member, or other individual may utilize to facilitate movement of the door 104 between the forward-most position, e.g., where the opening 108 is at least partially obstructed by the door 104 so that the door 104 at least partially covers the opening 108 to further enclose the passenger seat area 116, and the aft-most position, e.g., where the opening 108 is at least partially unobstructed by the door 104.

In certain aspects, the door 104 may be supported on the wall portion 102 via various suitable mechanisms or devices such that the door 104 is movable in the forward and aft direction. As some non-limiting examples, the door 104 may be slidable along at least one translation track, e.g., a rail 114, a channel, a track, etc., may be movable via at least one roller, or may utilize at least one various other mechanism or device as desired. For example, the rail 114 may be integrally formed with or coupled to the wall portion 102 and the door 104 may be slidably coupled to the wall portion 102 via the rail 114. The at least one translation track may be any suitable shape such as linear, curved, arcuate, stepped, or any other desired shape.

In some embodiments, the door 104 may be slidably coupled to the wall portion 102 and/or the rail 114, channel, track, etc. via a carriage member 118, which may also be referred to herein as an attachment plate. Additional details regarding the structure of the carriage member 118 are discussed below in relation to FIGS. 2A-3B.

The carriage member 118 may be coupled to the door 104 and may slide or move along the rail 114 in the forward and aft direction thus resulting in the door 104 moving. For example, as illustrated in FIG. 1B, the carriage member 118 and the door 104 may slide along the rail 114 as a unit relative to the wall portion 102. As shown, the carriage member 118 may remain coupled to the door 104 at the same position on the door 104, and thus the door 104 may move along the rail 114 as the carriage member 118 moves along the rail 114.

In certain embodiments, the door assembly 101 may include a locked state and an unlocked state. In the locked state, the carriage member remains coupled to the door 104 at the same position and the carriage member 118 and the door 104 may move along the rail 114 as a unit, as discussed above. In the unlocked state, as illustrated in FIG. 1C, the door 104 may be slidable relative to the carriage member 118 and the wall portion 102 as the carriage member 118 maintains a substantially stationary position along the rail 114.

The door 104 may include a channel 120, which is shown in FIG. 1B, a rail, a track, etc. along which the carriage member 118 may move when the door assembly 101 is in the unlocked state. For example, the carriage member 118 may be releasably coupled to the door 104 via the channel 120. When the door assembly 101 is in the unlocked state, the door 104 may move relative to the carriage member 118 and the wall portion 102 as at least a portion of the carriage member 118 travels along the channel 120.

By including at least two translation tracks, e.g., the rail 114 and the channel 120, in the door assembly 101, the door 104 may still be moved to an open or aft-most position should one of the translation tracks fail or become obstructed. For example, should the carriage member 118 get stuck at a position along the rail 114, the door assembly 101 may be unlocked so that the door 104 is slidable relative to the carriage member 118 and thus may still be moved to the open or aft-most position. This allows for a passenger to still exit the passenger seat unit 100 if needed and/or even if the rail 114 fails and the door 104 is in the forward-most position.

Additionally, by including two translation tracks as options for moving the door 104, the door assembly 101 may comply with various safety regulations such as FAA Points 19 and 20, which state that the mini-suite doors must not impede any egress paths in the open, closed or translating positions and that the mini-suite doors must be openable even in a crowded aisle.

The door assembly 101 may also include an actuator 122 that may be activated to change the lock state of the door assembly 101. The actuator 122 may be a latch, a button, a handle, a motion sensor, or any other suitable device. In some embodiments, the actuator 122 may be positioned at any suitable location on at least one of an inner surface or an outer surface of the door 104. In further embodiments, the actuator 122 may be positioned at any suitable location on at least one of an inner surface or an outer surface of the door 104. Additionally, multiple actuators 122 may be included in the door assembly 101 each of which may be activated to change the lock state of the door assembly 101.

In some aspects, the actuator 122 may be at least communicatively coupled to a portion of the door 104 and/or the carriage member 118. When the actuator 122 is activated, the door assembly 101 may change from a locked state to an unlocked state. Thus, the carriage member 118 may be released from the stationary coupling with the door 104 so that the carriage member 118 may move along the channel 120.

In some embodiments, the privacy shell 106 may include a shell latch, e.g., a slam latch system, a latch system, a magnetic system, a friction fit system, clips, and/or other suitable devices or mechanisms as desired, that selectively engages and retains the door 104 in the aft-most position. It will be appreciated that depending on the type of shell latch utilized, the shell latch may include various other and/or additional components as desired. As such, the shell latch may be various suitable devices or mechanisms for selectively retaining the door 104 in the aft-most position. The particular location of the shell latch on the privacy shell 106 and the portion of the door 104 that the shell latch engages should not be considered limiting on the disclosure.

In various embodiments, the passenger seat unit 100 may include various devices or mechanisms for selectively securing the door 104 in the forward-most position. Such devices or mechanisms may include, but are not limited to, a slam latch system, a latch system, a magnetic system, a friction fit system, clips, and/or other suitable devices or mechanisms as desired. The device or mechanism for selectively securing the door 104 in the forward-most position may be the same device or mechanism for selectively securing the door 104 in the aft-most position.

In some embodiments, the door 104 of the passenger seat unit 100 may include a single panel door 104, a door 104 having at least a first panel and a second panel, or a door 104 having more than two panels as desired. The multiple panels of the door 104 may be movable relative to one another, e.g., the first panel and the second panel may be coupled to one another using a hinge such that the first panel may be folded toward the second panel.

According to certain embodiments of the invention, as shown in FIGS. 2A-3B, a carriage member 200 may include a first protrusion 202 and a second protrusion 204. The carriage member 200 may be the same as or similar to the carriage member 118 discussed above with respect to FIGS. 1A-1C.

In some embodiments the first protrusion 202 and/or the second protrusion 204 may be substantially T-shaped to enable the carriage member 200 to withstand a greater load. However, the particular shape of the first protrusion 202 and the second protrusion 204 should not be considered limiting on the disclosure. The first protrusion 202 may extend in a first direction from the carriage member 200. In some embodiments, the first protrusion 202 may be coupled or engaged with the rail 114 to couple the carriage member 200 with the wall portion 102. Thus, the first protrusion 202 may move along the rail 114 to move the carriage member 200 along the wall portion 102.

The second protrusion 204 may extend in a second direction from the carriage member 200. In some embodiments, the second protrusion 204 may be coupled or engaged with the channel 120 to couple the carriage member 200 with the wall portion 102. When the door assembly 101 is in the locked state, the second protrusion 204 is stationary and may not be moved along the channel 120. When the door assembly 101 is in the unlocked state, the second protrusion 204 may move along the channel 120 to move the carriage member 200 along the door 104.

Figure 3A:
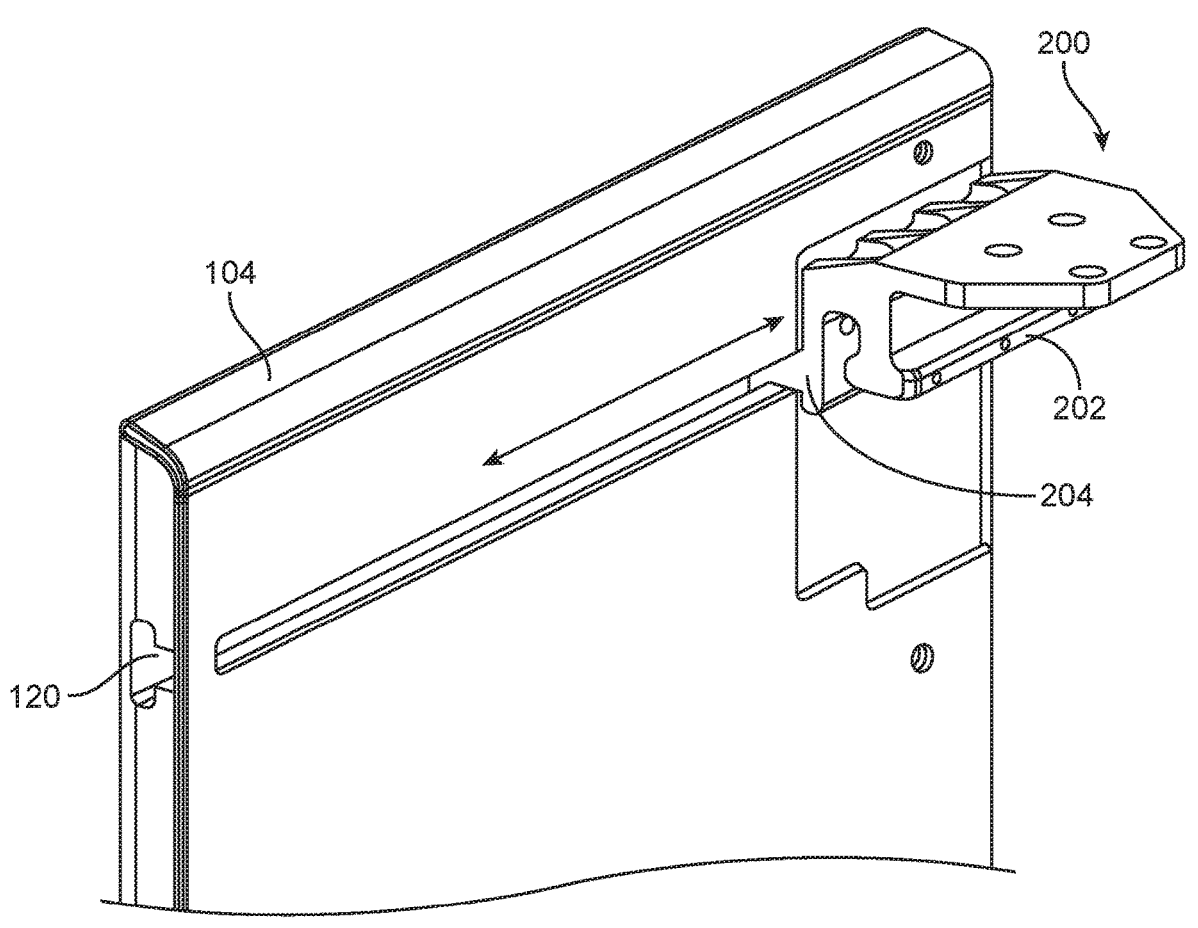
FIG. 3A is a perspective view of a carriage member engaged with a door of a door assembly, according to certain embodiments of the present invention.
Figure 3B:
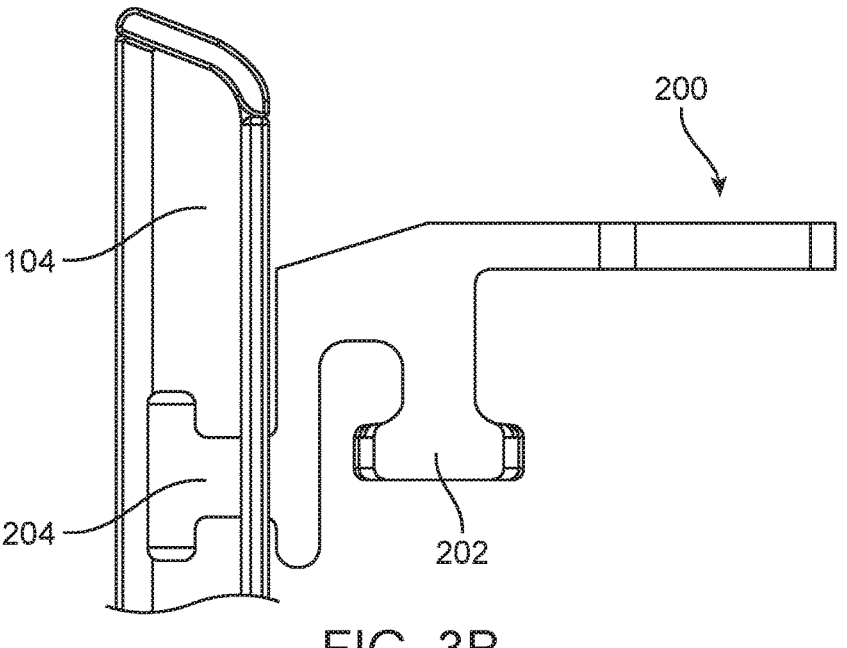
FIG. 3B is a front view of the carriage member engaged with the door of FIG. 3A.

As shown in FIGS. 3A and 3B, the channel 120 of the door 104 may be shaped to correspond to the shape of the second protrusion 204. For example, the channel 120 may also be T-shaped to accommodate the T-shaped second protrusion 204.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa). These examples are not meant to be mutually exclusive, exhaustive, or restrictive; and the disclosure is not limited to these examples but rather encompasses all possible modifications and variations within the scope of the issued claims and their equivalents.

Example 1. An aircraft door assembly (which may incorporate features of any of the subsequent examples) comprising: a stationary portion comprising at least one translation track; and a movable portion comprising at least one channel, wherein the movable portion is slidably coupled to the stationary portion via at least an attachment plate; wherein the aircraft door assembly comprises a locked state and an unlocked state; wherein in the locked state, the attachment plate and the movable portion are slidable as a unit relative to the stationary portion along the at least one translation track; and wherein in the unlocked state, the movable portion is slidable relative to the attachment plate and the stationary portion along the at least one channel.

Example 2. The aircraft door assembly of Example 1 or any of the preceding or subsequent examples, further comprising an actuator coupled to at least one of the stationary portion or the movable portion, wherein the actuator is activable to change the aircraft door assembly from the locked state to the unlocked state.

Example 3. The aircraft door assembly of Example 1 or any of the preceding or subsequent examples, wherein the attachment plate comprises at least one first protrusion and at least one second protrusion.

Example 4. The aircraft door assembly of Example 3 or any of the preceding or subsequent examples, wherein the at least one first protrusion is engageable with the at least one translation track and the at least one second protrusion is engageable with the at least one channel.

Example 5. The aircraft door assembly of Example 4 or any of the preceding or subsequent examples, wherein the at least one second protrusion is movable along the at least one channel when the aircraft door assembly is in the unlocked state.

Example 6. The aircraft door assembly of Example 3 or any of the preceding or subsequent examples, wherein at least one of the at least one first protrusion and the at least one second protrusion is T-shaped.

Example 7. The aircraft door assembly of Example 1 or any of the preceding or subsequent examples, wherein in the unlocked state, the attachment plate maintains a substantially stationary position.

Example 8. A passenger vehicle comprising a door assembly (which may incorporate features of any of the preceding or subsequent examples), the door assembly comprising: a stationary wall portion comprising at least one translation track; and a door portion comprising at least one channel, wherein the door portion is slidably coupled to the stationary wall portion via at least a carriage member; and an actuator, wherein the door portion is slidable relative to the carriage member and the stationary wall portion along the at least one channel upon the activation of the actuator.

Example 9. The passenger vehicle of Example 8 or any of the preceding or subsequent examples, wherein the at least one translation track comprises a rail assembly.

Example 10. The passenger vehicle of Example 8 or any of the preceding or subsequent examples, wherein the carriage member comprises at least one first protrusion and at least one second protrusion.

Example 11. The passenger vehicle of Example 10 or any of the preceding or subsequent examples, wherein the at least one first protrusion is engageable with the at least one translation track and the at least one second protrusion is engageable with the at least one channel.

Example 12. The passenger vehicle of Example 11 or any of the preceding or subsequent examples, wherein the door portion is slidable relative to the carriage member via the at least one second protrusion being movable along the at least one channel.

Example 13. The passenger vehicle of Example 10 or any of the preceding or subsequent examples, wherein at least one of the at least one first protrusion and the at least one second protrusion is T-shaped.

Example 14. The passenger vehicle of Example 8 or any of the preceding or subsequent examples, wherein the carriage member maintains a substantially stationary position.

Example 15. A method (which may incorporate features of any of the preceding or subsequent examples) of using an aircraft door assembly comprising a stationary portion and a movable portion slidably coupled to the stationary portion via at least a carriage member, the method comprising: changing a lock state of the aircraft door assembly to an unlocked state, wherein in the unlocked state the movable portion is slidable relative to the carriage member and the stationary portion along at least one channel of the movable portion; and sliding the movable portion relative to the carriage member.

Example 16. The method of Example 15 or any of the preceding or subsequent examples, wherein changing the lock state of the carriage member comprises activating an actuator coupled to at least one of the stationary portion or the movable portion.

Example 17. The method of Example 15 or any of the preceding or subsequent examples, wherein sliding the movable portion relative to the carriage member comprises sliding at least a portion of the carriage member along the at least one channel.

Example 18. The method of Example 15 or any of the preceding or subsequent examples, wherein the carriage member comprises at least one first protrusion and at least one second protrusion.

Example 19. The method of Example 15 or any of the preceding or subsequent examples, further comprising changing the lock state of the aircraft door assembly to a locked state, wherein in the locked state the movable portion and the carriage member are slidable as a unit relative to the stationary portion along at least one translation track, wherein the stationary portion comprises the at least one translation track.

Example 20. The method of Example 15 or any of the preceding or subsequent examples, wherein the carriage member remains substantially stationary as the movable portion is slid relative to the carriage member.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An aircraft door assembly comprising:
a stationary portion comprising at least one translation track; and
a movable portion comprising at least one channel, wherein the movable portion is slidably coupled to the stationary portion via at least an attachment plate having a first length, the attachment plate comprising:
at least one first protrusion engageable with and arranged within the at least one translation track; and
at least one second protrusion engageable with and arranged within the at least one channel, wherein:
the at least one first protrusion is stationarily fixed to the attachment plate;
the at least one second protrusion is stationarily fixed to the attachment plate;
the at least one first protrusion extends from the attachment plate in a first direction, the at least one second protrusion extends from the attachment plate in a second direction, and the first direction and the second direction are perpendicular;
the at least one first protrusion and the at least one second protrusion each extends a second length, wherein the first and second lengths are equal; and
both the at least one first protrusion and the at least one second protrusion are T-shaped;
wherein the aircraft door assembly comprises a locked state and an unlocked state;
wherein in the locked state, the attachment plate and the movable portion are slidable as a unit relative to the stationary portion along the at least one translation track; and
wherein in the unlocked state, the movable portion is slidable relative to the attachment plate and the stationary portion and the at least one second protrusion is slidable within the at least one channel.

2. The aircraft door assembly of claim 1, wherein the at least one translation track and the at least one channel are linear.

3. The aircraft door assembly of claim 1, wherein the at least one translation track is shaped to correspond to a shape of the at least one first protrusion, and the at least one channel is shaped to correspond to a shape of the at least one second protrusion.

4. The aircraft door assembly of claim 1, wherein in the unlocked state, the attachment plate maintains a substantially stationary position relative to the stationary portion.

5. A passenger vehicle comprising a door assembly, the door assembly comprising:
a stationary wall portion comprising at least one translation track; and
a door portion comprising at least one channel, wherein the door portion is slidably coupled to the stationary wall portion via at least a carriage member having a first length, the carriage member comprising:
at least one first protrusion engageable with and arranged within the at least one translation track; and
at least one second protrusion engageable with and arranged within the at least one channel, wherein:
the at least one first protrusion engageable with and arranged within the at least one translation track is stationarily fixed to the carriage member;
the at least one second protrusion engageable with and arranged within the at least one channel is stationarily fixed to the carriage member;
the at least one first protrusion extends from the carriage member in a first direction, the at least one second protrusion extends from the carriage member in a second direction, and the first direction and the second direction are perpendicular;
the at least one first protrusion and the at least one second protrusion each extends a second length, wherein the first and second lengths are equal; and
both the at least one first protrusion and the at least one second protrusion are T-shaped;
wherein the door assembly comprises a locked state and an unlocked state;
wherein in the locked state, the door portion and the carriage member are slidable as a unit relative to the stationary wall portion along the at least one translation track; and
wherein in the unlocked state, the door portion is slidable relative to the carriage member and the stationary wall portion via the at least one second protrusion being movable within the at least one channel.

6. The passenger vehicle of claim 5, wherein the at least one translation track comprises a rail assembly.

7. The passenger vehicle of claim 5, wherein the at least one translation track and the at least one channel are linear.

8. The passenger vehicle of claim 5, wherein the at least one translation track is shaped to correspond to a shape of the at least one first protrusion, and the at least one channel is shaped to correspond to a shape of the at least one second protrusion.

9. The passenger vehicle of claim 5, wherein in the unlocked state, the carriage member maintains a substantially stationary position with respect to the stationary wall portion.

10. A method of using an aircraft door assembly comprising a stationary portion comprising at least one translation track and a movable portion comprising at least one channel and being slidably coupled to the stationary portion via at least a carriage member having a first length, the carriage member comprising at least one first protrusion engageable with and arranged within the at least one translation track; at least one second protrusion engageable with and arranged within the at least one channel; wherein the at least one first protrusion engageable with and arranged within the at least one translation track is stationarily fixed to the carriage member; the at least one second protrusion engageable with and arranged within the at least one channel is stationarily fixed to the carriage member; wherein the at least one first protrusion extends from the carriage member in a first direction, the at least one second protrusion extends from the carriage member in a second direction, and the first direction and the second direction are perpendicular; wherein the at least one first protrusion and the at least one second protrusion each extends a second length, wherein the first and second lengths are equal; and both the at least one first protrusion and the at least one second protrusion are T-shaped, the method comprising:

changing the aircraft door assembly from a locked state to an unlocked state, wherein in the unlocked state the movable portion is slidable relative to the carriage member and the stationary portion and the at least one second protrusion is slidable within the at least one channel of the movable portion; and sliding the movable portion relative to the carriage member.

11. The method of claim 10, wherein the at least one translation track and the at least one channel are linear.

12. The method of claim 10, wherein the at least one translation track is shaped to correspond to a shape of the at least one first protrusion, and the at least one channel is shaped to correspond to a shape of the at least one second protrusion.

13. The method of claim 10, further comprising changing the aircraft door assembly to the locked state, wherein in the locked state the movable portion and the carriage member are slidable as a unit relative to the stationary portion along the at least one translation track.

14. The method of claim 10, wherein the carriage member remains substantially stationary relative to the stationary portion as the movable portion is slid relative to the carriage member in the unlocked state of the aircraft door assembly.

\* \* \* \* \*